United States Patent Office 3,420,750
Patented Jan. 7, 1969

3,420,750
DISTILLING PHTHALIC ANHYDRIDE
Gerhard Schaefer, Hubert Suter, and Friedrich Wirth, Ludwigshafen (Rhine), and Walter Mann, Lampertheim, Hesse, Germany, assignors to Badische Anilin- & Soda-Fabrik Aktiengesellschaft, Ludwigshafen (Rhine), Germany
Filed May 19, 1967, Ser. No. 639,829
Claims priority, application Germany, May 21, 1966, B 87,234; Apr. 15, 1967, B 92,089
U.S. Cl. 203—72                    2 Claims
Int. Cl. B01d 3/00

ABSTRACT OF THE DISCLOSURE

The distillation of phthalic anhydride is carried out under vacuum pressure of 20 to 200 mm. Hg and temperature of 160° to 240° C. followed by falling film evaporation.

---

Figure 1:
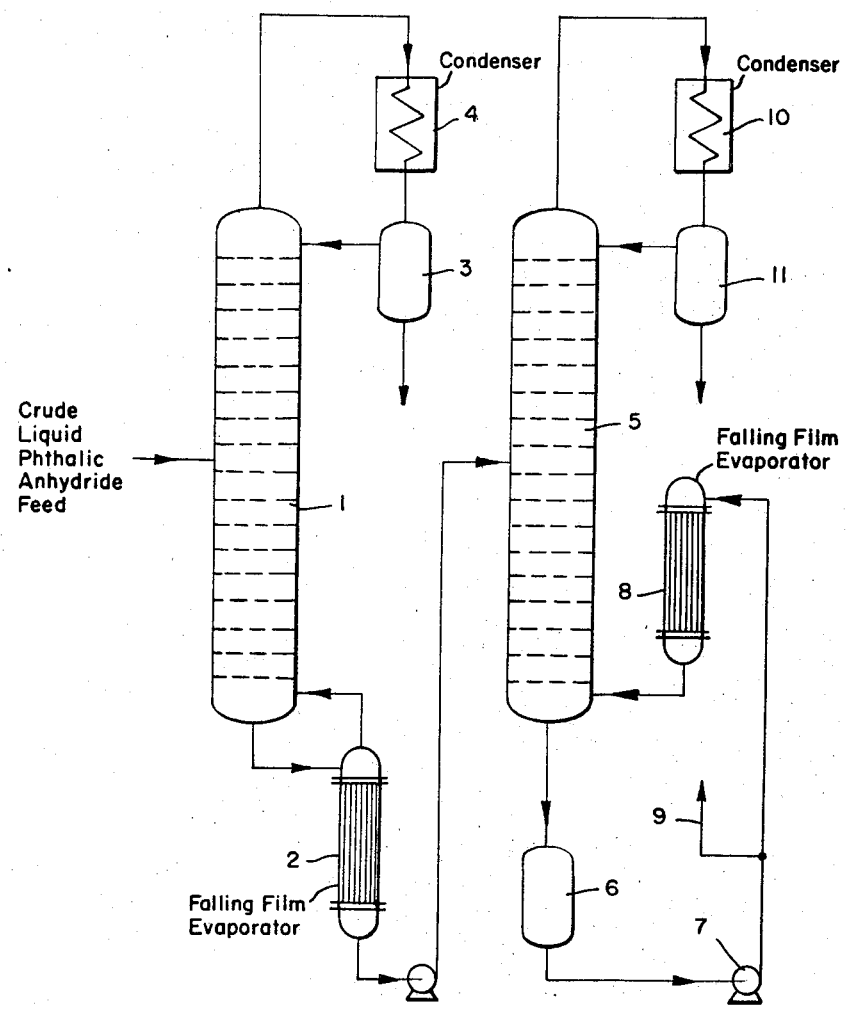

The invention relates to an improved process for distilling phthalic anhydride.

Phthalic anhydride is purified on a large scale by distillation. Subatmospheric pressure and temperatures of about 200° C. are used. At these temperatures the impurities in the crude product tend to resinify while at the same time a small amount of phthalic anhydride decomposes. The resin often separates in the course of the distillation as a separate liquid phase and forms encrustations on the walls of the vessels. Such a coating is troublesome, particularly on heating surfaces, because it greatly decreases heat exchange. In batchwise still distillation the proportion of resin is particularly high owing to the long residence time in the still. Therefore continuous distillation is often resorted to in which tube evaporators are used. Although formation of residue and resin is less, there is considerably more encrustation of the heating surfaces and consequently a much greater risk of local overheating because part of the heating surface is constantly in contact with the residue which has been substantially freed from phthalic anhydride. These evaporators therefore have to be changed frequently and cleaned by a troublesome procedure.

It is an object of this invention to provide a method of distilling phthalic anhydride in which no encrustation whatever of the heating surface takes place and in which trouble-free continuous operation is ensured over very long periods. Another object of the invention in the distillation of phthalic anhydride prepared by oxidation of o-xylene is to substantially free the distillation residue from phthalic anhydride so that subsequent distillation of the residue is unnecessary and therefore capital costs and labor are saved.

These and other objects are achieved in a process for the continuous distillation of phthalic anhydride using a film evaporation zone in which less than 60% by weight of the product supplied to the evaporation zone is evaporated.

Surprisingly no encrustation whatever of the heating surface is observed even after very long periods. No local overheating occurs at all. Loss by decomposition reactions is minimal owing to the short periods of contact with the heating surface.

Whereas it has hitherto been thought to be necessary in continuous distillation to carry the distillation only to such an extent that at least 80% of phthalic anhydride is contained in the residue, and then to concentrate this residue in a subsequent residue distillation to a content of 50% phthalic anhydride or to substantially free it from phthalic anhydride using special spray evaporators in a stream of nitrogen, this residue distillation can be dispensed with in the new method using phthalic anhydride prepared by oxidation of o-xylene. Considerable savings in the cost of the phthalic anhydride distillation are thus achieved, both as regards capital costs and as regards labor requirements and operating costs.

The new method is generally suitable for the distillation of phthalic anhydride. Crude phthalic acid prepared by oxidation of o-xylene or by oxidation of naphthalene may be used. The starting material may be substantially freed from impurities, for example naphthoquinone, contained therein by thermal treatment, in the presence or absence of alkaline substances or of sulfuric acid. Both phthalic anhydride which contains small amounts of low boiling components and phthalic anhydride which is practically free from low boiling components may be used. The content of high boiling components and residue may vary widely and in the case of phthalic anhydride prepared from o-xylene is in general from 0.5 to 85% by weight, particularly from 10 to 70% by weight, and in the case of phthalic anhydride prepared from naphthalene is in general from 1 to 15% by weight.

Distillation is carried out in the conventional temperature range, for example from 160° to 240° C., and usually at subatmospheric pressure, for example from 20 to 200 mm. Hg.

An essential feature of the new method is that less than 60% by weight of the product supplied to the evaporator is evaporated, preferably from 5 to 50% by weight and particularly from 15 to 50% by weight. This ensures that all the surfaces of the evaporator are continually rinsed with product and no deposits whatever are formed.

The amount of phthalic anhydride contained in the portion which is not evaporated may, when using phthalic anhydride obtained from o-xylene, be chosen at will in the range of practically 0 to about 99% by weight. Obviously it is advantageous to evaporate not more than the phthalic anhydride content of the product supplied so that a phthalic anhydride distillate is obtained which is substantially free from high-boiling components. When using phthalic anhydride obtained from naphthalene it is advantageous to evaporate only such an amount of the product supplied to the evaporator that the fraction which does not evaporate has a phthalic anhydride content of at least 80% by weight.

Distillation is carried out in a conventional film evaporation zone, i.e. in a film evaporator of conventional design, preferably in a falling-film evaporator or a vertical tube evaporator. Vapor and unvaporized liquid may be passed cocurrently or countercurrently through the evaporator.

To purify crude phthalic anhydride which is strongly contaminated it is advantageous to combine features of the conventional continuous phthalic anhydride distillation with the process of the invention. This continuous distillation is usually carried out in two stages, low boiling components being separated first and then pure phthalic anhydride is distilled off from the residue and withdrawn from the top. In both the first and second stages, evaporation according to the new method may be carried out in each case at the foot of the column.

Figure 2:
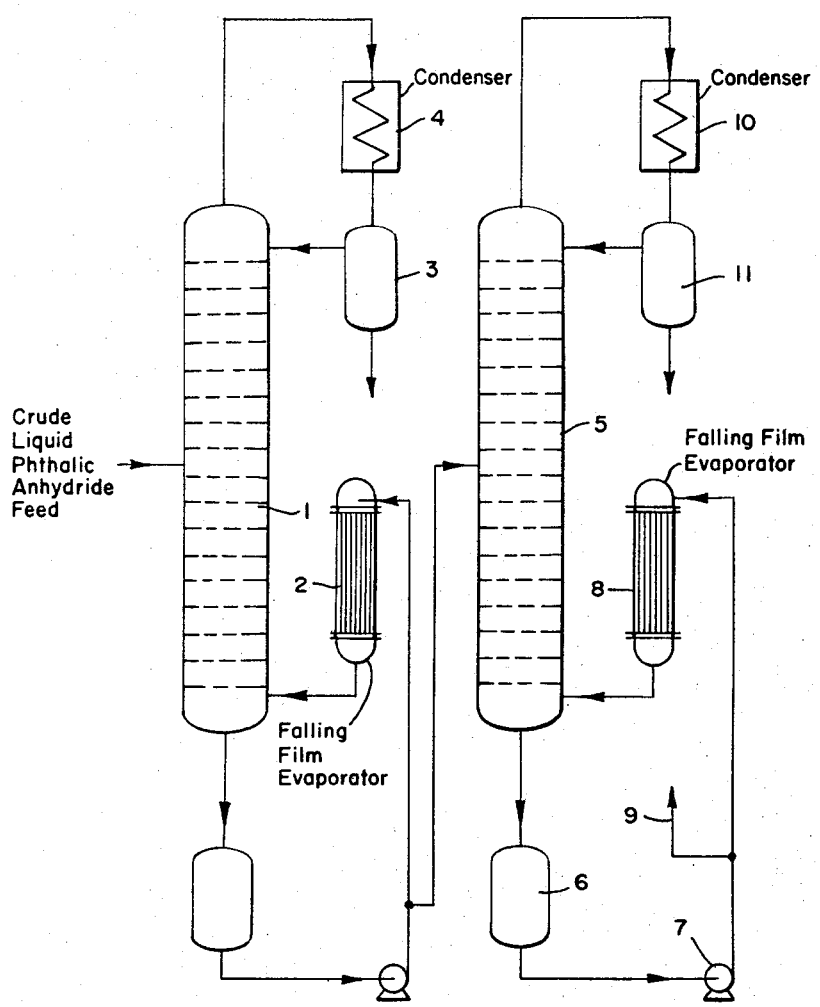

The invention is illustrated by the following examples in which parts are by weight. Example 1 is given with reference to FIGURE 1 of the accompanying drawings and Examples 2 and 3 are given with reference to FIGURE 2 of the accompanying drawings. Each figure shows diagrammatically an arrangement of apparatus suitable for carrying out the method according to this invention.

EXAMPLE 1

23.6 parts per hour of crude liquid phthalic anhydride obtained by oxidation of o-xylene and preheated to 215°

C. (which contains 0.5% by weight of lower boiling components and 0.2% by weight of higher boiling components) is introduced into a column 1 (FIGURE 1) having 18 theoretical trays, which is operated under a pressure of 150 mm. Hg at a bottoms temperature of 222° C. and a top temperature of 197° C. Introduction is effected at the level of the twelfth actual tray. At the same time 8.7 parts per hour of reflux from a vessel 3 is introduced into the upper portion of the column 1. The product flows from the bottom of the column 1 into a falling-film evaporator 2. This evaporator contains a vertically disposed bundle of tubes whose ends are built into tube sheets. Distribution means which uniformly distribute the liquid to the tubes are provided above the upper tube sheet. The size of the evaporator is chosen so that the amount of product introduced flows down as a thin film on the inside of the tubes. The vapor formed is introduced countercurrently to the liquid from the top of the evaporator 2 into the column 1. While 23.4 parts per hour of a product consisting of 99.8% of phthalic anhydride and 0.2% of residue passes through the evaporator in direct flow, such an amount of phthalic anhydride is evaporated that an amount of product of 8.7 parts (consisting of 40% of phthalic anhydride and 60% of lower boiling components) condenses at the top of column 1 in the cooler 4. 0.2 part per hour of this condensate is withdrawn, while 8.5 parts are returned to the top of the column 1 as reflux.

The liquid product withdrawn at the bottom of the evaporator 2 in an amount of 23.4 parts per hour is supplied to the tenth tray of a column 5 having 18 theoretical trays. At the same time 23.4 parts of reflux from vessel 11 is introduced per hour into the upper part of column 5. The product leaving the lower part of column 5 is passed by means of a pump 7 through a buffer vessel 6 into a falling-film evaporator 8. The amount per hour is 270 parts of product consisting of 90% by weight of phthalic anhydride and 10% by weight of residue. The evaporator 8 is of the same design as the evaporator 2 but liquid and vapor flow cocurrently through the tubes. 46 parts per hour of product is evaporated in evaporator 8. The vapor is supplied to column 5. It is condensed in condenser 10 at the top of the column 5. 23 parts per hour of condensate is withdrawn as pure phthalic anhydride while another 23 parts per hour is returned as a reflux to the top of the column. 0.4 part per hour of a product consisting of 90% of phthalic anhydride and 10% of residue is withdrawn through line 9 from the stream circulating through the pump 7. No deposits whatever can be detected on the evaporator surfaces after uninterrupted operation for several months.

EXAMPLE 2

23.6 parts of a liquid phthalic anhydride (which has been obtained by oxidation of o-xylene, contains 0.5% by weight of lower boiling components and 0.4% by weight of higher boiling components and has been preheated to 215° C.) is introduced at the level of the twelfth actual tray into a column 1 (in FIGURE 2) having 18 theoretical trays which is operated at a pressure of 150 mm. Hg, a bottoms temperature of 222° C. and a top temperature of 197° C. At the same time 8.7 parts per hour of reflux is introduced from vessel 3 into the upper part of the clumn 1. The product is pumped from the bottom of the column 1 through an intermediate vessel into a falling-film evaporator 2. This evaporator contains a vertical bundle of tubes whose ends are built into tube sheets. Distribution means are provided above the upper tube sheet and distribute the liquid to the tubes. The vapor formed is introduced cocurrently to the liquid from the lower part of the evaporator into the column 1. While 23.4 parts per hour of a product consisting of 99.6% of phthalic anhydride and 0.4% of residue passes through the evaporator, such an amount of phthalic anhydride is evaporated that 8.7 parts per hour of product consisting of 40% of phthalic anhydride and 60% of lower boiling components condenses in condenser 4 at the top of the column 1. 0.2 part of this condensate is withdrawn per hour while 8.5 parts is returned to the top of column 1 as a reflux. Operation of the evaporator is made possible by a recycle stream of phthalic anhydride amounting to 104 parts per hour.

A branch stream from the liquid product supplied to the evaporator, in an amount of 23.4 parts per hour, is supplied to the tenth tray of a column 5 having 18 theoretical trays. At the same time 23.4 parts per hour of reflux from vessel 11 is supplied to the upper part of the column 5. The product leaving the lower part of the column 5 is passed by means of a pump 7 through a buffer vessel 6 into a falling-film evaporator 8, the hourly amount being 270 parts of product consisting of 25% by weight of phthalic anhydride and 75% by weight of residue and higher boiling point compounds. Evaporator 8 is of the same design as evaporator 2 and liquid and vapor flow cocurrently through the tubes. 46.6 parts per hour of product evaporates in the evaporator 8. The vapor is fed into column 5. It is condensed in condenser 10 at the top of the column 5. 23.3 parts per hour of condensate is withdrawn as pure phthalic anhydride while another 23.3 parts per hour is returned to the top of column 5 as reflux. 0.1 part per hour of a product consisting of 25% of phthalic anhydride and 75% of residue and high boiling point compounds is withdrawn from the pump cycle through line 9. No deposits whatever can be detected on the evaporator surfaces after uninterrupted operation for several months.

EXAMPLE 3

10.6 parts per hour of a crude phthalic anhydride which has been obtained by oxidation of naphthalene is supplied to the third tray from below in a column 1 (FIGURE 2) having 8 theoretical trays. This product contains 0.2% of lower boiling components and 1.8% of high boiling and solid components. Distillation is carried out at a top pressure of 150 mm. Hg, a top temperature of 197° C. and a bottoms temperature of 215° C. From a reflux of 5.3 parts per hour at the top of the column 0.2 part per hour is withdrawn and returned to the pretreatment unit. A recycle stream of 42.4 parts of phthalic anhydride per hour is supplied to the vertical falling-film evaporator 2. 10.4 parts per hour is withdrawn from this recycle stream and supplied to the first tray of a second column 5 having 6 theoretical trays. 8.5 parts of pure phthalic anhydride is withdrawn per hour from this column with a reflux of 8.5 parts per hour. 52 parts per hour of product is supplied to the evaporator 8 by pump 7 and 17 parts thereof is evaporated. 1.9 parts of residue is withdrawn from this recycle stream per hour.

We claim:

1. A process for the continuous distillation of a phthalic anhydride composition derived from the oxidation of an organic compound selected from the group consisting of o-xylene and naphthalene, the distillation being carried out in two stages with low solids deposit on hot evaporator surfaces, which process comprises feeding a crude mixture of said phthalic anhydride composition containing impurities in a series flow through a first and second contact zone having vapor-liquid contact trays under a vacuum pressure of 20 to 200 mm. Hg and at temperature of 160° to 240° C., removing vapors overhead from the first contact zone and condensing them and returning a portion thereof as reflux to the first zone, flowing the bottoms from the first contact zone to a falling-film evaporator, returning the vapors from the evaporator to the lower section of the first contact zone, flowing the bottoms from the evaporator after less than 60% by weight of the phthalic anhydride and impurities present therein has evaporated to the second contact zone, withdrawing bottoms from the second contact zone and passing them to a second falling-film evaporator, returning a liquid and vapor portion flowing cocurrently downward through the second evaporator to the bottom section of the second contact zone, condensing overhead vapor from the second contact zone and returning a portion of the condensate as reflux to the second contact zone, and withdrawing the remaining condensate as substantially pure phthalic anhydride.

2. A process as claimed in claim 5 wherein 5–50% by weight of the phthalic anhydride and impurities present in said first-mentioned falling-film evaporator is evaporated.

References Cited

UNITED STATES PATENTS

| | | | |
|---|---|---|---|
| 2,128,323 | 8/1938 | Rodgers et al. | 260—346.7 |
| 2,165,378 | 7/1939 | Hickman | 203—89 X |
| 3,011,955 | 12/1961 | Brown | 260—346.7 X |
| 3,054,729 | 9/1962 | Smith | 203—89 X |
| 3,084,110 | 4/1963 | Polk | 203—7 |
| 3,280,009 | 10/1966 | Ackerman et al. | 260—346.7 X |
| 3,289,734 | 12/1966 | Robertson | 203—7 X |

FOREIGN PATENTS

| | | |
|---|---|---|
| 1,167,810 | 4/1964 | Germany. |
| 545,132 | 10/1956 | France. |
| 795,229 | 5/1958 | Great Britain. |

NORMAN YUDKOFF, *Primary Examiner.*

F. E. DRUMMOND, *Assistant Examiner.*

U.S. Cl. X.R.

203—89, 94; 202—236; 260—346.7